United States Patent
Killey et al.

(10) Patent No.: US 9,881,356 B2
(45) Date of Patent: Jan. 30, 2018

(54) DATA PROCESSING METHOD (71) Applicant: BAE SYSTEMS PLC, London (GB)

(72) Inventors: Ainsley Killey, Bristol (GB); Philip Dale, Bristol (GB)

(73) Assignee: BAE Systems plc, London (GB)

(*) Notice: Subject to any disclaimer, the term of this patent is extended or adjusted under 35 U.S.C. 154(b) by 0 days.

(21) Appl. No.: 15/102,057

(22) PCT Filed: Nov. 21, 2014

(86) PCT No.: PCT/EP2014/075278
§ 371 (c)(1),
(2) Date: Jun. 6, 2016

(87) PCT Pub. No.: WO2015/086295
PCT Pub. Date: Jun. 18, 2015

(65) Prior Publication Data
US 2016/0314561 A1    Oct. 27, 2016

(30) Foreign Application Priority Data

Dec. 10, 2013  (EP) .................................... 13275305
Dec. 10, 2013  (GB) ................................... 1321781.5

(51) Int. Cl.
G06K 9/00    (2006.01)
G06T 5/00    (2006.01)
G06T 5/20    (2006.01)

(52) U.S. Cl.
CPC ............. G06T 5/001 (2013.01); G06T 5/009 (2013.01); G06T 5/20 (2013.01);
(Continued)

(58) Field of Classification Search
CPC ........... G06T 5/001; G06T 5/009; G06T 5/20; G06T 2207/10052; G06T 2207/10036;
(Continued)

(56) References Cited

U.S. PATENT DOCUMENTS 5,640,468 A * 6/1997 Hsu .................... G06K 9/00201
                                              382/190
6,008,492 A   12/1999 Slater et al.
(Continued)

FOREIGN PATENT DOCUMENTS

EP    0384009 A2   8/1990
GB    2506649 A    4/2014
WO    2014045012 A1  3/2014

OTHER PUBLICATIONS

PCT International Search Report and Written Opinion dated Feb. 27, 2015 of Patent Application No. PCT/EP2014/075279 filed Nov. 21, 2014.
(Continued)

Primary Examiner — Ali Bayat
(74) Attorney, Agent, or Firm — Maine Cernota & Rardin (57) ABSTRACT

A data processing method is disclosed for processing hyperspectral image data of a scene. The method comprises sequentially receiving portions of the data at a data buffer to form a data set comprising a predefined number of data portions and calculating a set of global statistical parameters and data correction factors using the data forming the data set. The method further comprises receiving a further data portion at the data buffer and simultaneously removing the earliest received data portion at the data buffer, from the data set, and subsequently calculating a set of local statistical parameters using the data of the further data portion. The method further comprises updating the set of global statistical parameters using the set of local statistical parameters and correcting the data of the data portion removed from the data set using the correction factors. The method further comprises outputting the corrected data portion and set of global statistical parameters calculated using the data set comprising the removed data portion, to a processor.

18 Claims, 4 Drawing Sheets (52) U.S. Cl.
CPC .............. *G06T 2207/10036* (2013.01); *G06T 2207/20021* (2013.01); *G06T 2207/20076* (2013.01); *G06T 2207/30181* (2013.01); *G06T 2207/30232* (2013.01)

(58) Field of Classification Search
CPC . G06T 2207/30232; G06T 2207/20076; G06T 2207/20021
See application file for complete search history.

(56) References Cited

U.S. PATENT DOCUMENTS

| | | | |
|---|---|---|---|
| 6,151,424 A * | 11/2000 | Hsu | G06K 9/00201 382/294 |
| 6,771,798 B1 | 8/2004 | Haas et al. | |
| 7,194,111 B1 | 3/2007 | Schaum et al. | |
| 8,400,502 B2 * | 3/2013 | Zakrzewski | B64D 45/0015 348/122 |
| 8,571,325 B1 | 10/2013 | Robinson | |
| 8,897,570 B1 * | 11/2014 | Robinson | G06K 9/4652 250/339.01 |
| 2004/0153284 A1 | 8/2004 | Bernstein et al. | |
| 2007/0003155 A1 | 1/2007 | Miller et al. | |
| 2010/0288910 A1 | 11/2010 | Robinson | |
| 2012/0263382 A1 | 10/2012 | Robinson | |
| 2013/0039580 A1 | 2/2013 | Robles-Kelly | |
| 2013/0235211 A1 | 9/2013 | Fontanella | |
| 2014/0050352 A1 | 2/2014 | Buehler | |
| 2014/0050405 A1 | 2/2014 | Del Amo | |
| 2014/0118555 A1 | 5/2014 | Hegg | |
| 2014/0133754 A1 | 5/2014 | Sebastian | |
| 2016/0110584 A1 * | 4/2016 | Remiszewski | G06T 7/0012 382/133 |
| 2017/0059408 A1 | 3/2017 | Korner | |

OTHER PUBLICATIONS

European Search Report dated Jun. 2, 2014 of Patent Application No. 13275306.2 filed Dec. 10, 2013.
Great Britain Search Report dated Jun. 10, 2014 of Patent Application No. 1321783.1 filed Dec. 10, 2013.
Dimitris Manolakis et al: "Detection Algorithms for Hyperspectral Imaging Applications", IEEE Signal Processing Magazine, IEEE Service Center, Piscataway, NJ, US, vol. 19, No. 1, Jan. 1, 2002, pp. 29-43, XP011093744, ISSN: 1053-5888, p. 29-p. 35.
Bernadette Johnson et al: "Compact active hyperspectral imaging system for the detection of concealed targets", Proceedings of SPIE, vol. 3710, Aug. 2, 1999, pp. 144-153, XP055090117, ISSN: 0277-786X, DOI: 10.1117/12.357002, p. 145-p. 148.
Brian David Bue et al: "Automated Labeling of Materials in Hyperspectral Imagery", IEEE Transactions on Geoscience and Remote Sensing, IEEE Service Center, Piscataway, NJ, US, vol. 48, No. 11, Nov. 1, 2010, pp. 1059-4070, XP011316326, ISSN: 0196-2892, p. 4059-p. 4062.
Manolakis, Dimitris, David Marden, and Gary A Shaw: "Hyperspectral Image Processing for Automatic Target etection Applications", Lincoln Laboratory Journal 14.1 (2003): 79-116.
Schaum A Ed—Rahnamai K et al: "Local Covariance Equalization of Hyperspectral Imagery: Advantages and Limitations for Target Detection", Aerospace Conference, 2005 IEEE, IEEE, Piscataway, NJ, US, Mar. 5, 2005, pp. 1-11, XP010864301, DOI: 10.1109/AERO.2005.1559491, ISBN: 978-0-7803-8870-3, p. 2-p. 3.
Gary J Bishop et al: "Spectral Tracking of Objects in Real Time", Proceedings of SPIE, vol. 7119, Oct. 2, 2008, p. 71190D, XP05510330, ISSN: 0277-786X, DOI: 10.1117/12.802202.
Blecher Segev H et al: "Detecting Anomalous Objects in Hyperspectral Data Using Segmentation", Proceedings of the SPIE—The International Society for Optical Engineering SPIE—The International Society for Optical Engineering USA, vol. 7113, 2008, XP002725228, ISSN: 0277-786X.
Hong Xu, Xiangjun Wang, Yanan Yu, "Research on Infrared Multispectral Imaging Detection Technology", Proceedings of SPIE, vol. 7384, 2009, pp. 738429-1-738429-7, XP002725229, DOI: 10.1117/12.197161.
International Preliminary Report on Patentability and Written Opinion for PCT Application No. PCT/EP2014/075278, dated Jun. 23, 2016, 7 pages.
Eismann M T et al: "Airborne hyperspectral detection of small changes", Applied Optics, Optical Society of America, Washington, DC; US, Published Oct. 1, 2008.
EP Search Report of Application No. EP13275305.4 filed Dec. 10, 2013, dated May 8, 2014.
GB Search Report of Application No. GB1321781.5 filed Dec. 10, 2013, dated Jun. 9, 2014.
PCT Search Report of Application No. PCT/EP20141075278 filed Nov. 21, 2014, dated Mar. 2, 2015.
Schaum A Ed—Rahnamai K et al: "Local Covariance Equalization of Hyperspectral Imagery: Advantages and Limitations for Target Detection", Aerospace Conference, 2005 IEEE, IEEE, Piscataway, NJ, US, Published Mar. 5, 2005.

* cited by examiner

Figure 4

DATA PROCESSING METHOD

RELATED APPLICATIONS

This application is a national phase application filed under 35 USC §371 of PCT Application No. PCT/EP2014/075278 with an International filing date of Nov. 21, 2014 which claims priority of GB Patent Application 1321781.5 filed Dec. 10, 2013 and EP Patent Application 13275305.4 filed Dec. 10, 2013. Each of these applications is herein incorporated by reference in its entirety for all purposes.

FIELD OF THE INVENTION

The present invention relates to a data processing method and particularly, but not exclusively, to a data processing method for processing hyperspectral image data of a scene.

BACKGROUND OF THE INVENTION

Different materials and objects reflect and emit different wavelengths of electromagnetic radiation. Hyperspectral imaging involves collecting images of objects within a scene at multiple wavelengths of the electromagnetic radiation using a sensor. The spectrum of radiation captured at each pixel of the sensor can then be analysed to provide information about the makeup of the objects observed by the pixel.

Hyperspectral imaging techniques facilitate the locating and identifying of objects within the scene with high accuracy, provided prior spectral information of the objects is available. If no prior knowledge is available, then the technique is limited to the locating and identifying of objects which are highly anomalous with the scene background.

The performance of hyperspectral methods is dependent on the extent and accuracy of the predetermined spectral information. However, atmospheric conditions for example, can attenuate and otherwise degrade the typical spectrum reflected off objects within the scene, which degrades the signal that can be observed by an imaging system. This reduces the ability of the hyperspectral technique to discriminate one object from another.

Several different atmospheric correction techniques have been proposed, but these techniques can be slow and require large amounts of data for an accurate correction to be applied.

In addition to the above problems, detection algorithms which process the hyperspectral image data require statistics about the data in order to improve the detection of objects. The calculation of the statistics can be slow and require large amounts of data for accurate calculation. These issues impede the use of high fidelity hyperspectral techniques for high speed or real time applications.

SUMMARY OF THE INVENTION

In accordance with the present invention as seen from a first aspect, there is provided a data processing method for processing hyperspectral image data of a scene, the method comprising:
 a) sequentially receiving portions of the data at a data buffer to form a data set comprising a predefined number of data portions;
 b) calculating a set of global statistical parameters and data correction factors using the data forming the data set;
 c) receiving a further data portion at the data buffer and simultaneously removing the earliest received data portion at the data buffer, from the data set,
 d) calculating a set of local statistical parameters using the data of the further data portion;
 e) updating the set of global statistical parameters using the set of local statistical parameters;
 f) correcting the data of the data portion removed from the data set using the correction factors; and
 g) outputting the corrected data portion and set of global statistical parameters calculated using the data set comprising the removed data portion, to a processor.

Advantageously, the method maintains an up-to-date account of the statistical parameters as the data is acquired, and provides for an accurate correction of the data portions.

Preferably, the method comprises repeating steps (c) to (g) until all data portions of the data have been received at the data buffer.

Preferably, the method further comprises recalculating the data correction factors when the data buffer receives the predefined number of further data portions.

In an embodiment, the method further comprises sequentially receiving each set of local statistical parameters corresponding to each removed data portion, to a further data buffer, until a further predefined number of sets of local parameters have been received in the further data buffer, to form a further data set. For each subsequent further data portion received at the data buffer and thus data portion removed from the data buffer, the method further comprises receiving a further set of local statistical parameters at the further data buffer and removing the earliest received set of local statistical parameters from the further data set.

The statistical parameters preferably comprise the mean and covariance of the data forming the data set or data portion, as applicable.

In an embodiment, the method further comprises processing the or each outputted corrected data portion and set of global statistical parameters, according to a detection algorithm to locate targets within the scene.

In accordance with the present invention as seen from a second aspect, there is provided a data processing method for processing hyperspectral image data of a scene, the method comprising:
 a) sequentially receiving portions of the data at a data buffer to form a data set comprising a predefined number of data portions;
 b) calculating a set of global statistical parameters and data correction factors using the data forming the data set;
 c) receiving a further data portion at the data buffer and simultaneously removing the earliest received data portion at the data buffer, from the data set,
 d) calculating a set of first local statistical parameters using the data of the further data portion;
 e) calculating a set of second local statistical parameters using the data of the removed data portion;
 f) updating the set of global statistical parameters using the set of first local statistical parameters;
 g) outputting the set of second local statistical parameters to a further data buffer;
 h) correcting the data of the data portion removed from the data set using the correction factors; and
 i) outputting the corrected data portion and set of global statistical parameters calculated using the data set comprising the removed data portion, to a processor.

Advantageously, the method of the second aspect maintains a log of the statistical parameters so that a synchronisation of the data processing steps can be maintained.

Preferably, the method comprises repeating steps (c) to (i) and sequentially receiving the sets of second local statistical parameters at the further buffer, until the further data buffer comprises a further predefined number of sets of second local statistical parameters, to form a further data set.

The method subsequently further comprises receiving a further set of second local statistical parameters at the further data buffer and removing the earliest received set of second local statistical parameters from the further data set, for each subsequent further data portion received at the data buffer and thus data portion removed from the data set.

Preferably, the method of the second aspect comprises repeating steps (c) to (i) for all data portions of the data.

Preferably, the method further comprises recalculating the data correction factors when the data buffer receives the predefined number of further data portions.

The statistical parameters preferably comprise a mean and covariance of the data forming the data set or data portion, as applicable.

In an embodiment, the method further comprises processing the or each outputted corrected data portion and set of global statistical parameters calculated using the data set comprising the corresponding removed data portion, according to a detection algorithm to locate targets within the scene.

In accordance with the present invention as seen from a third aspect, there is provided a data processing method for processing hyperspectral image data of a scene, the method comprising:
a) imaging the scene to determine a scene object contrast factor; and,
b) processing the data of the scene according to the method of the first aspect or the method of the second aspect in dependence upon the scene object contrast factor.

In accordance with the present invention as seen from a fourth aspect, there is provided apparatus comprising a processor configured to execute the data processing methods of any of the first and/or second and/or third aspects.

BRIEF DESCRIPTION OF THE DRAWINGS

Embodiments of the present invention will now be described by way of example only and with reference to the accompanying drawings, in which.

DETAILED DESCRIPTION

Figure 1:
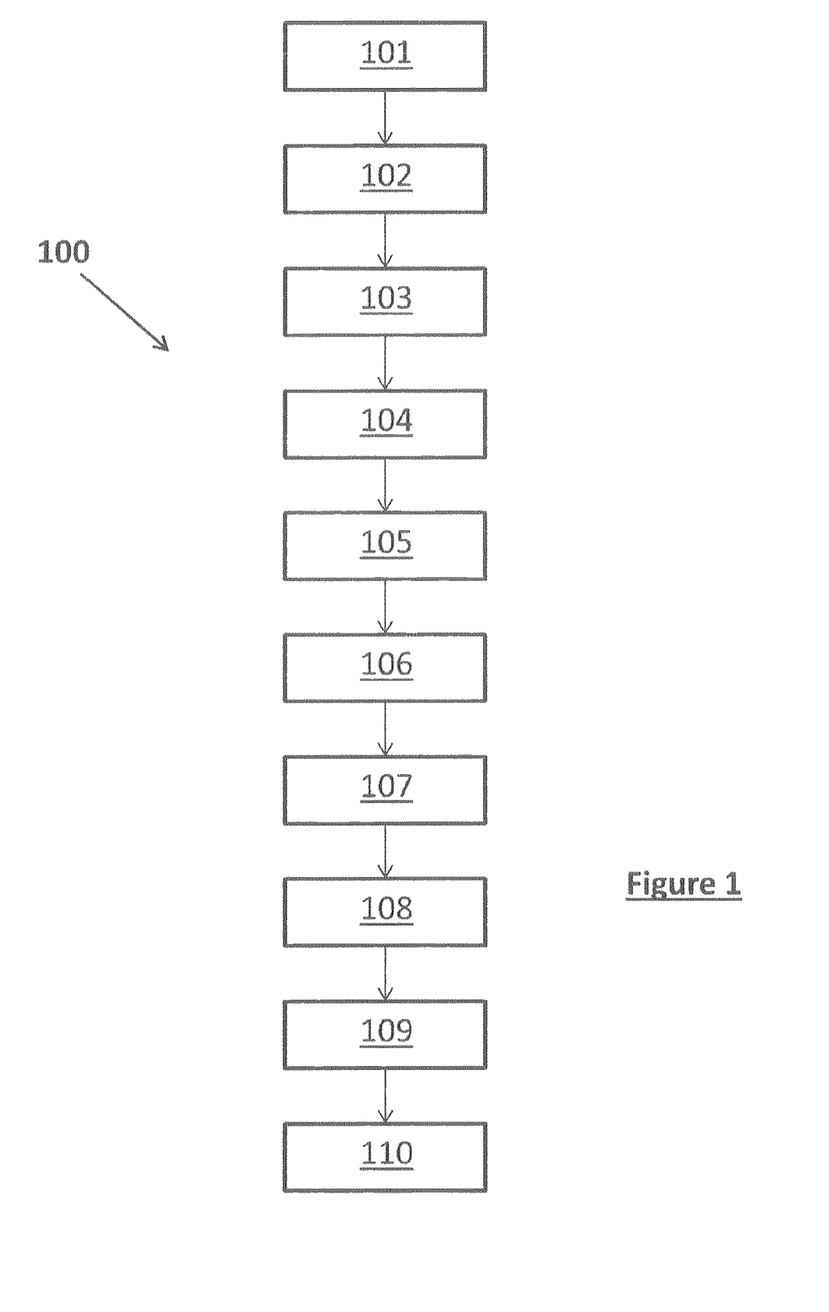
FIG. 1 is a flow chart outlining the steps associated with the data processing method of the first aspect.

Referring to FIG. 1 of the drawings, there is illustrated a data processing method 100 for processing hyperspectral image data of a scene according to a first embodiment of the present invention. The data processing method 100 is arranged to process the raw image data from the scene and extract the relevant statistical parameters of the data for subsequent use in detection algorithms which are used to identify and locate objects within the scene. The method 100 is further arranged to correct the raw image data to account for any absorption, scattering and/or blurring for example, of the radiation as it passed from the object through the atmosphere This may be achieved using publically available correction algorithms such as QUAC (Quick Atmospheric Correction), FLAASH (Fast Line-of-Sight Atmospheric Analysis of Spectral Hypercubes) and ICEE ( ) algorithms. The data processing method 100 according to the first embodiment is concerned with obtaining and refining the statistical parameters of the raw image data in addition to correcting the image data, for use with the detection algorithms for a particular a scene type, namely a scene which is substantially unchangeable with position, such as a scene of a desert.

Figure 4:
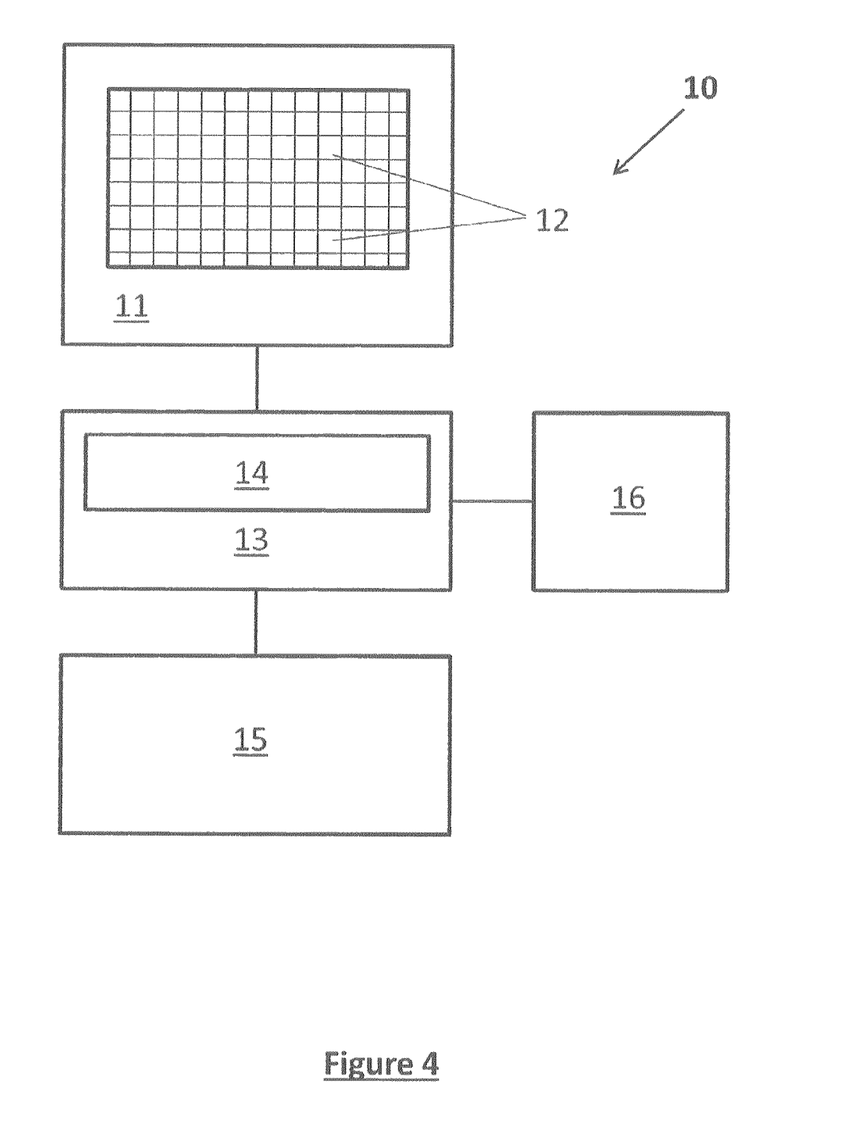

The method 100 is performed using apparatus 10 according to an embodiment of the present invention, as illustrated in FIG. 4 of the drawings. The apparatus 10 comprises a sensor 11 having a plurality of sensing pixels 12 arranged to a grid of rows and columns, each pixel 12 being arranged to receive radiation from the scene. The sensor 11 is arranged in communication with a processor 13 of the apparatus 10 which is arranged to receive the image data, namely the spectral information from each pixel 12 of the sensor 11. The image data is sequentially received at a pre-processor buffer 14 a portion at a time, at step 101, each portion corresponding to the image data of a complete row of pixels 12 of the sensor 11. In this respect, each data portion may comprise image data from 1000 pixels 12, for example.

The data portions are received into the buffer 14, until the buffer 14 becomes full of data portions. The size of the buffer 14 and thus the number of data portions capable of being held in the pre-processor buffer 14 may be selectable by the operator (not shown) of the apparatus 10. Once the pre-processor buffer 14 has been filled with a pre-defined number of data portions, the set of image data within the pre-processor buffer 14 is processed at step using the processor 13 to calculate a set of global statistical parameters of the data at step 102, including a mean and covariance parameter. The data set is also processed to determine correction coefficients for the data at step 103, to account for atmospheric variations and attenuation of radiation, for example.

Upon receiving a further data portion, the earliest received data portion of the data set is removed from the pre-processor buffer 14 at step 104 and the data of the removed data portion is corrected using the pre-calculated correction coefficients at step 105. The corrected data portion and set of global statistical parameters calculated using the data set comprising the removed data portion, is output to an object detection processor 15 at step 106, which is arranged to process the corrected data portion and the associated set of global statistical parameters for identifying and locating the objects within the scene.

The data associated with the further received data portion is also processed at step 107 to calculate a set of local statistical parameters of the further data portion. This local set is subsequently used to update the previously calculated set of global statistical parameters to generate a new set of global statistical parameters at step 108.

Each further data portion that is received from the sensor 11 into the pre-processor buffer 14, results in the corresponding earliest received data portion of the data set becoming removed and corrected, and subsequently passed to the object detection processor 15, together with the set of global statistical parameters calculated using the data set comprising the most recently removed data portion from the data set.

Once the pre-processor buffer 14 has received the pre-defined number of further data portions, the correction coefficients are recalculated at step 109 and applied to correct the data portions held within the pre-processor buffer 14, until the pre-processor buffer 14 has received a further predefined number of further data portions. In this respect, in situations where the pre-processor buffer 14 can receive N data portions, the correction coefficients are recalculated every time a further N data portions are received into the pre-processor buffer 14.

This data processing method 100 is repeated until all data portions of scene image data have been received at the pre-processor buffer 14.

Figure 2:
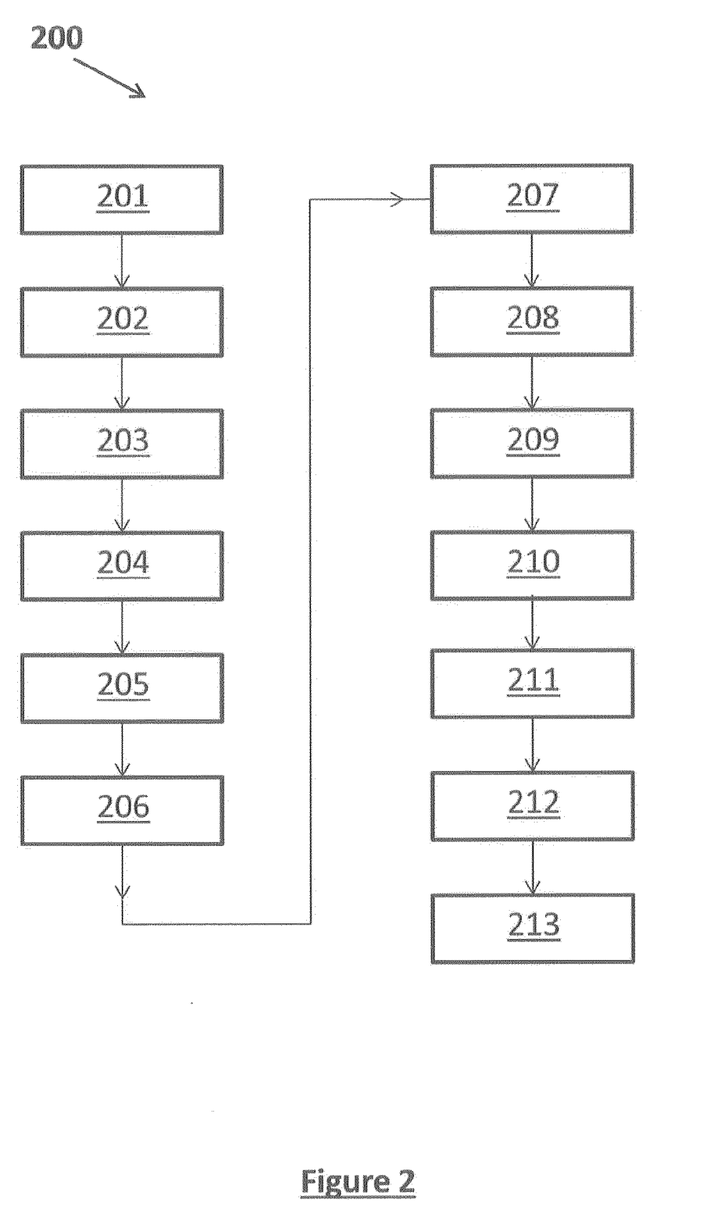
FIG. 2 is a flow chart outlining the steps associated with the data processing method of the second aspect.

Referring to FIG. 2 of the drawings, there is illustrated a data processing method 200 for processing hyperspectral image data of a scene according to a second embodiment of the present invention. Similar to the data processing method 100 of the first embodiment, the data processing method 200 of the second embodiment is arranged to process the raw image data from the scene and extract the relevant statistical parameters of the data, in addition to correcting the image date, for subsequent use in detection algorithms. The data processing method 200 according to the second embodiment is concerned with obtaining and refining the statistical parameters of the raw image data for use with the detection algorithms, for a particular scene type, namely a changeable scene, such as a scene of a city.

The data processing method 200 of the second embodiment is an extension of the data processing method 100 of the first embodiment, however, for completeness, the data processing method 200 of the second embodiment, is described in full below.

The method 200 of the second embodiment is performed using the above described apparatus 10, as illustrated in FIG. 4 of the drawings. The data portions are received sequentially from the sensor 11 into the pre-processor buffer 14 at step 201, until the buffer 14 becomes full of data portions. Again, the size of the buffer 14 and thus the number of data portions capable of being held in the pre-processor buffer 14 may be selectable by an operator (not shown) of the apparatus 10. Once the pre-processor buffer 14 has been filled with a pre-defined number of data portions, the set of image data within the pre-processor buffer 14 is processed using the processor 13 at step 202 to calculate a set of global statistical parameters of the data, including a mean and covariance parameter. The data set is also processed at step 203 to determine correction coefficients for the data, to account for atmospheric variations and attenuation of radiation, for example.

Upon receiving a further data portion, the earliest received data portion of the data set is removed from the pre-processor buffer 14 at step 204 and the data of the removed data portion is corrected at step 205 using the calculated correction coefficients. The corrected data portion and the set of global statistical parameters calculated using the data set comprising the removed data portion, is output to an object detection processor 15 at step 206 which is arranged to process the corrected data portion and the associated statistical parameters for identifying and locating the objects within the scene.

The data associated with the further received data portion is also processed at step 207 to calculate a set of first local statistical parameters of the further data portion. This set of first local parameters is subsequently used to update the previously calculated set of global statistical parameters at step 208 to generate a new set of global statistical parameters. The data associated with the removed data portion is also processed to determine a set of second local statistical parameters at step 209, including a mean and covariance of the removed data portion, and this set of second local statistical parameters is output to a statistics buffer 16 at step 210.

Each further data portion that is received from the sensor 11 into the pre-processor buffer 14, results in the corresponding earliest received data portion of the data set becoming removed from the pre-processor buffer 14 and corrected, and subsequently passed to the object detection processor 15, together with the set of global statistical parameters calculated using the data set comprising the most recently removed data portion. At the same time, each set of second local statistical parameters of the corresponding removed data portion are sequentially added to the statistics buffer 16, until a pre-defined number of sets of second local statistical parameters have been received. This number is dependent on the size of the statistics buffer 16, but may be varied in accordance with the operator settings. Each further set of second local statistical parameters that is received into the statistics buffer 16 at step 211 causes the earliest received set to be removed therefrom at step 212 and so the statistics buffer provides a temporary history of a (pre-defined) number of data portions that have been processed by the object detection processor 15. Once the data portions have been removed from the data buffer 14 and processed according to the detection algorithms, the data is effectively lost. The statistics buffer 16 however, provides a rolling record of the statistical parameters of a number of removed data portions (the actual number being determined by the size of the statistical buffer 16) and can be used as a reference in situations where it may be necessary to recover scene information, as may be necessary in situations where the features of the scene change rapidly with position and also to maintain a synchronisation between the processing steps of the method.

Once the pre-processor buffer 14 has received the pre-defined number of further data portions, the correction coefficients are recalculated at step 213 and applied to correct the data portions held within the pre-processor buffer 14, until the pre-processor buffer 14 has received a further predefined number of further data portions. In this respect, in situations where the pre-processor buffer 14 can receive N data portions, the correction coefficients are recalculated every time a further N data portions are received into the pre-processor buffer 14.

This data processing method 200 is repeated until all data portions of scene image data have been received at the pre-processor buffer 14.

Figure 3:
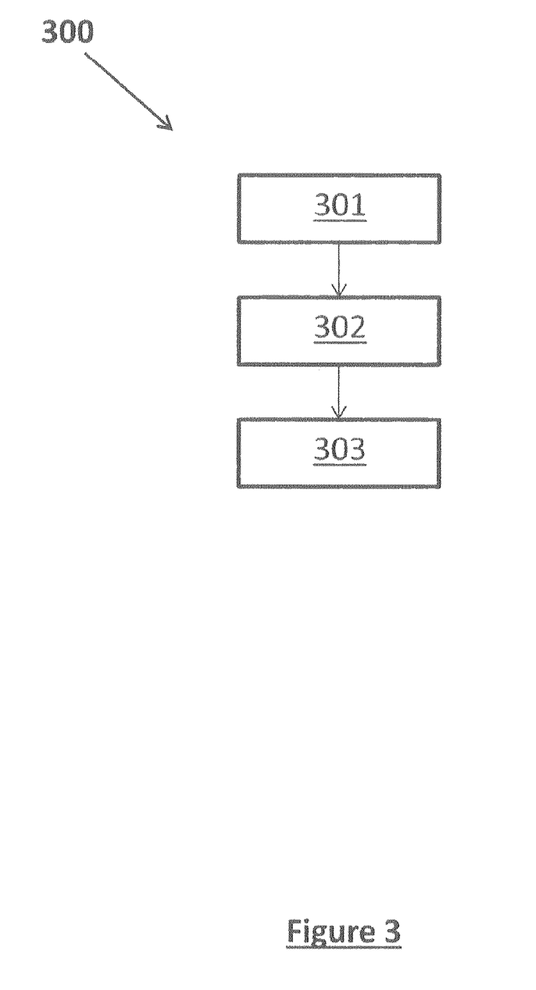
FIG. 3 is a flow chart outlining the steps associated with the data processing method of the third aspect; and, FIG. 4 is a schematic illustration of the apparatus of the fourth aspect for processing data according to the first and/or second and/or third aspects of data processing methods.

The apparatus 10 according to an embodiment of the present invention, as illustrated in FIG. 4 of the drawings, collects and calculates correction coefficients and image statistics and subsequently enables an operator (not shown) to select the appropriate method 100, 200 for processing the data. The operator (not shown) selects the appropriate method 100, 200 according to the scene being viewed to provide optimum statistical parameters and data correction, to facilitate the identification and location of the scene objects. The method 100, 200 is chosen according to a data processing method 300 according to a third embodiment of the present invention, as illustrated in FIG. 3 of the drawings. The method 300 of the third embodiment comprises acquiring image data of the scene at step 301 using the apparatus 10 and processing the image data at step 302 to initially determine a scene image contrast factor, which is indicative of the scene type or environment. The scene type may be one in which the scene is substantially isotropic, or one in which the scene is substantially anisotropic. In addition, the objects of the scene may substantially blend into the background or be highly anomalous with the background. The contrast factor is arranged to take into account these variations in scene type and once this contrast factor has been determined, the method 300 of the third embodiment processes the contrast factor at step 303, to determine the most appropriate method 100, 200 of subsequently processing the image data of the scene.

Whilst the invention has been described above, it extends to any inventive combination of features set out above. Although illustrative embodiments of the invention are described in detail herein with reference to the accompanying drawings, it is to be understood that the invention is not limited to these precise embodiments.

Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

What is claimed is:

1. A data processing method for processing hyperspectral image data of a scene, the method comprising:
   a) sequentially receiving portions of the data at a data buffer to form a data set comprising a predefined number of data portions;
   b) calculating a set of global statistical parameters and data correction factors using the data forming the data set;
   c) receiving a further data portion at the data buffer and simultaneously removing the earliest received data portion at the data buffer, from the data set,
   d) calculating a set of local statistical parameters using the data of the further data portion;
   e) updating the set of global statistical parameters using the set of local statistical parameters;
   f) correcting the data of the data portion removed from the data set using the correction factors; and
   g) outputting the corrected data portion and set of global statistical parameters calculated using the data set comprising the removed data portion, to a processor.

2. A data processing method according to claim 1, further comprising repeating steps (c) to (g).

3. A data processing method according to claim 2, further comprising recalculating the data correction factors when the data buffer receives the predefined number of further data portions.

4. A data processing method according to claim 2 further comprising sequentially receiving each set of local statistical parameters corresponding to each removed data portion, to a further data buffer, until a further predefined number of local sets have been received in the further data buffer to form a further data set.

5. A data processing method according to claim 4, further comprising receiving a further set of local statistical parameters at the further data buffer and removing the earliest received set of local statistical parameters from the further data set for each subsequent further data portion received at the data buffer.

6. A data processing method according to claim 1, wherein the global statistical parameters comprise a mean and a covariance of the data forming the data set, and the local statistical parameters comprise a mean and a covariance of the data forming the data portion.

7. A data processing method according to claim 1, further comprising processing the outputted corrected data portion and set of global statistical parameters according to a detection algorithm to locate targets within the scene.

8. A data processing method for processing hyperspectral image data of a scene, the method comprising:
   a) sequentially receiving portions of the data at a data buffer to form a data set comprising a predefined number of data portions;
   b) calculating a global set of statistical parameters and data correction factors using the data forming the data set;
   c) receiving a further data portion at the data buffer and simultaneously removing the earliest received data portion at the data buffer, from the data set,
   d) calculating a first set of local statistical parameters using the data of the further data portion;
   e) calculating a second set of local statistical parameters using the data of the removed data portion;
   f) updating the global set of statistical parameters using the first set of local statistical parameters;
   g) outputting the second set of local statistical parameters to a further data buffer;
   h) correcting the data of the data portion removed from the data set using the correction factors; and
   i) outputting the corrected data portion and global set of statistical parameters calculated using the data set comprising the removed data portion, to a processor.

9. A data processing method according to claim 8, further comprising repeating steps (c) to (i).

10. A data processing method according to claim 9, further comprising sequentially receiving the sets of second local statistical parameters at the further data buffer, until the further data buffer comprises a further predefined number of sets of second local statistical parameters, to form a further data set.

11. A data processing method according to claim 10, further comprising receiving a further set of second local statistical parameters at the further data buffer and removing the earliest received set of second local statistical parameters from the further data set.

12. A data processing method according to claim 8, further comprising recalculating the data correction factors when the data buffer receives the predefined number of further data portions.

13. A data processing method according to claim 8, wherein the global set of statistical parameters comprise a mean and covariance of the data forming the data set, and the first and second sets of local statistical parameters comprise means and covariances of the data forming the further and removed data portions, respectively.

14. A data processing method according to claim 8, further comprising processing the outputted corrected data portion and set of global statistical parameters according to a detection algorithm to locate targets within the scene.

15. A data processing method according to claim 1, further comprising:
   a) imaging the scene to determine a scene object contrast factor; and,
   b) calculating the global set of statistical parameters, the set of local statistical parameters, and the data correction factors in dependence upon the scene object contrast factor.

16. Apparatus comprising a processor configured to execute the data processing method of claim 1.

17. A data processing method according to claim 8, further comprising:

a) imaging the scene to determine a scene object contrast factor; and,
b) calculating the global set of statistical parameters, the first and second sets of local statistical parameters, and the data correction factors in dependence upon the scene object contrast factor.

18. An apparatus comprising a processor configured to process hyperspectral image data of a scene by executing the following data processing steps:
a) sequentially receiving portions of the data at a data buffer to form a data set comprising a predefined number of data portions;
b) calculating a global set of statistical parameters and data correction factors using the data forming the data set;
c) receiving a further data portion at the data buffer and simultaneously removing the earliest received data portion at the data buffer, from the data set,
d) calculating a first set of local statistical parameters using the data of the further data portion;
e) calculating a second set of local statistical parameters using the data of the removed data portion;
f) updating the global set of statistical parameters using the first set of local statistical parameters;
g) outputting the second set of local statistical parameters to a further data buffer;
h) correcting the data of the data portion removed from the data set using the correction factors; and
i) outputting the corrected data portion and global set of statistical parameters calculated using the data set comprising the removed data portion, to a processor").

* * * * *